(12) United States Patent
Zamek et al.

(10) Patent No.: US 7,683,659 B1
(45) Date of Patent: Mar. 23, 2010

(54) INTEGRATED CIRCUITS WITH JITTER-REDUCING BALANCING LOGIC

(75) Inventors: Iliya G. Zamek, San Jose, CA (US); Nafira Daud, Pleasanton, CA (US); Peter Boyle, Mountain View, CA (US); Eugene V. Gomez, San Pablo, CA (US)

(73) Assignee: Altera Corporation, San Jose, CA (US)

( * ) Notice: Subject to any disclaimer, the term of this patent is extended or adjusted under 35 U.S.C. 154(b) by 73 days.

(21) Appl. No.: 12/060,791

(22) Filed: Apr. 1, 2008

(51) Int. Cl.
*H03K 17/16* (2006.01)
*H03K 19/003* (2006.01)

(52) U.S. Cl. .......................... 326/33; 326/26; 365/228
(58) Field of Classification Search ................. 326/26, 326/33, 38, 40; 333/181; 327/535; 365/226, 365/228; 363/39; 455/127.1
See application file for complete search history.

(56) References Cited

U.S. PATENT DOCUMENTS

| | | | |
|---|---|---|---|
| 6,060,902 A | 5/2000 | Albu et al. | |
| 6,538,518 B1 | 3/2003 | Chengson | |
| 6,847,246 B1 | 1/2005 | Kaviani et al. | |
| 7,236,555 B2 | 6/2007 | Brewer | |
| 7,359,811 B1 * | 4/2008 | Liu | 702/69 |
| 2008/0055018 A1 * | 3/2008 | Umamichi et al. | 333/181 |

* cited by examiner

*Primary Examiner*—Daniel D Chang
(74) *Attorney, Agent, or Firm*—Treyz Law Group; G. Victor Treyz

(57) ABSTRACT

Integrated circuits contain core logic that is powered using a power supply signal. The core logic contains simultaneously switching circuitry. The simultaneously switching circuitry contributes to noise on the power supply signal. Balancing circuitry may be provided on the integrated circuit to compensate for the simultaneously switching circuitry in the core logic. The balancing circuitry may receive an input signal that is out of phase with respect to the input to the core logic. As the balancing circuitry switches out of phase with the simultaneously switching circuitry of the core logic, the noise contribution from the core logic is compensated and power supply noise on the power supply signal is minimized.

17 Claims, 10 Drawing Sheets

INTEGRATED CIRCUITS WITH JITTER-REDUCING BALANCING LOGIC

BACKGROUND

This invention relates to integrated circuits, and more particularly, to integrated circuits with balancing logic that can help to reduce jitter due to power supply voltage variations.

System noise and jitter can adversely affect the performance of modern integrated circuits. Modern circuit designs often require the use of high data rates. Signal timing stability is important for proper device operation, particularly at high data rates. Signal timing stability can be adversely affected by power supply noise. For example, when a number of circuits on an integrated circuit are switched simultaneously, power supply glitches may be produced. These glitches may affect both the positive power supply rail and the power supply ground. The switching speed of digital logic circuits can be affected by the magnitude of the power supply voltage that is used to supply the circuits with power. Circuits generally switch more slowly when they are underpowered than when they are overpowered. Sensitive circuitry that is being powered by power supply signals that contain glitches may therefore experience timing variations (jitter).

Although the impact of power supply noise can sometimes be minimized by switching at slower speeds, this may not be a practical solution for many circuit designs. The use of decoupling capacitors and low-inductance power supply paths may help to reduce the amount of power supply noise in a given integrated circuit, but these techniques are often insufficient to eliminate power supply noise.

It would therefore be desirable to be able to provide improved arrangements for minimizing power supply noise and the resulting signal jitter in integrated circuits.

SUMMARY

In accordance with the present invention, integrated circuits are provided that contain regions of circuitry. The regions of circuitry may be, for example, regions of core logic on a programmable logic device integrated circuit or other integrated circuit. The core logic may have an input that receives an input signal and may have an output at which corresponding output data signals are provided.

The core logic is powered by a power supply voltage. The power supply voltage may be supplied to the core logic using a positive power supply terminal and a ground power supply terminal. The core logic may contain numerous programmable logic device logic elements or other circuit elements that switch simultaneously in response to transitions in the input signal. The simultaneous switching of the circuitry in the core logic contributes power supply noise to the power supply voltage.

The integrated circuit may be provided with balancing circuitry to compensate for the power supply noise that is produced by the simultaneously switching circuitry in the core logic. The balancing circuitry may be connected to the same positive power supply terminal and ground power supply terminal as the core logic and may be powered by the same power supply signal as the core logic. The balancing circuitry may contain circuitry that is identical to the simultaneous switching circuitry of the core logic or that functions in substantially the same way. The balancing circuitry need not produce output signals, because the balancing circuitry serves to balance and compensate for the simultaneous switching activity of the core logic without need to produce any data signals for use by downstream circuitry on the integrated circuit.

If desired, control circuitry may be used to adjust the strength of the balancing circuitry as a function of time. The control circuitry may contain a memory array filled with control signal data. A memory controller may be used to selectively address columns of the memory array. Control signals from the memory array may be conveyed to corresponding control gates in the balancing circuitry. The control gates may selectively pass an inverted version of an input signal that is provided to the simultaneously switching circuitry of the core logic.

A computer aided design tool may be used to implement the balancing circuitry from programmable logic on an integrated circuit. Configuration data produced by the computer aided design tool may be loaded into a programmable logic device integrated circuit to configure programmable logic on the programmable logic device integrated circuit to implement the balancing circuitry and the control circuitry.

Further features of the invention, its nature and various advantages will be more apparent from the accompanying drawings and the following detailed description of the preferred embodiments.

DETAILED DESCRIPTION

Figure 1:
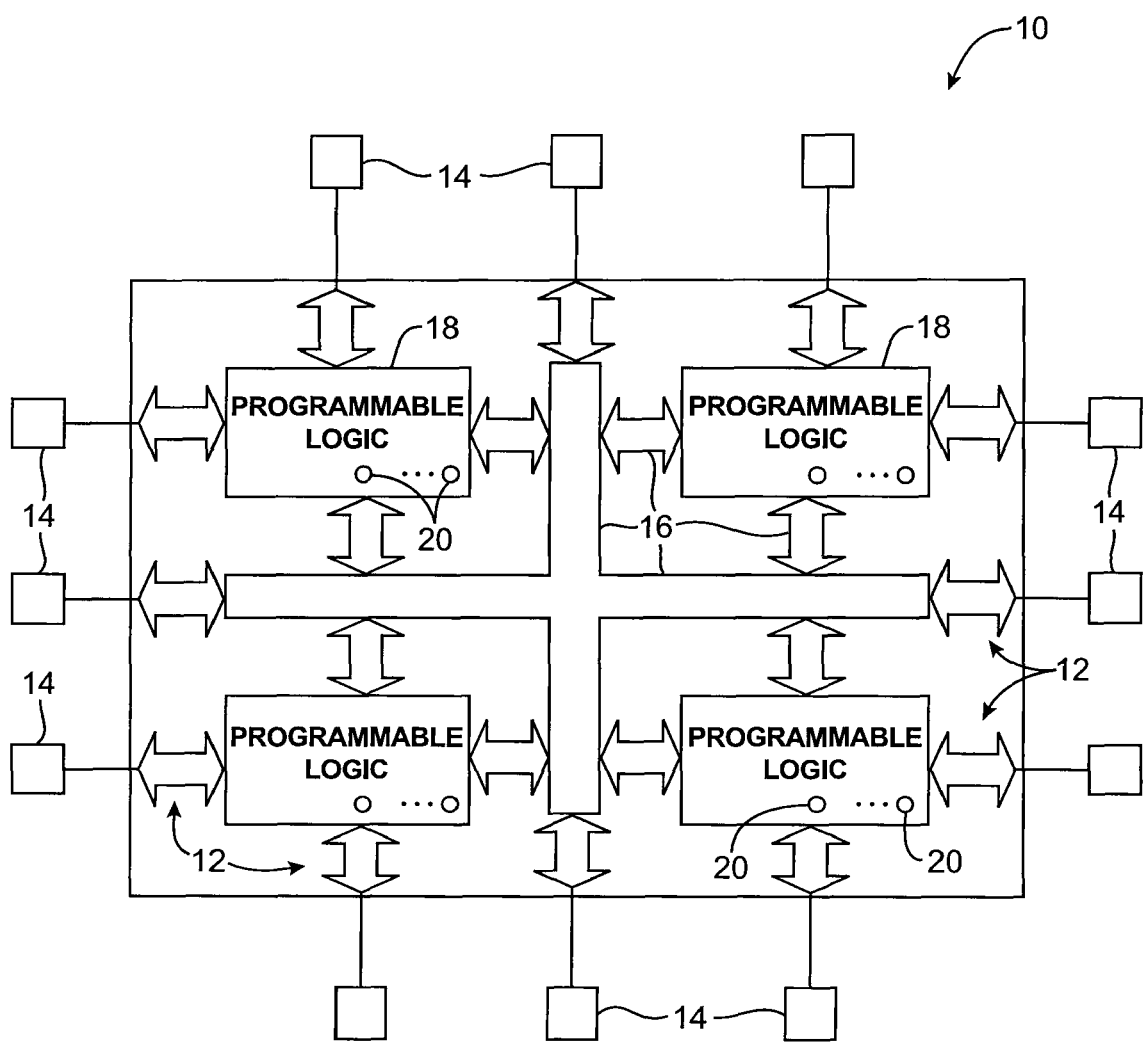
FIG. 1 is a diagram of an illustrative integrated circuit such as a programmable logic device integrated circuit in which balancing circuitry may be used to reduce power supply noise and signal jitter in accordance with an embodiment of the present invention.

The present invention relates to reducing power supply noise in integrated circuits. The integrated circuits may be memory chips, digital signal processing circuits, microprocessors, application specific integrated circuits, programmable logic device integrated circuits, or any other suitable integrated circuit. On integrated circuits such as these, signal switching can lead to power supply noise. This power supply noise may, in turn, adversely affect the performance of sensitive circuits.

Consider, as an example, a situation when a block of circuitry receives a periodic input signal. The periodic input signal may be, for example, a clock signal or a train of digital pulses with an associated signal frequency. If the block of circuitry contains a number of similar or identical circuit elements, these circuit elements may switch simultaneously. For example, a block of circuitry may contain a number of inverters or other logic gates that all receive substantially identical digital input signals. Such digital signals may be synchronized to a common clock. Because the digital input to the block of circuitry is synchronized to a common clock, the inverters or other logic gates in the circuit block may all switch simultaneously on the rising and falling edges of the digital signal. During these switching operations, current spikes may be produced that create power supply voltage sag and ground bounce effects. Voltage sag and ground bounce can cause the power supply voltage to vary from its nominal value.

Power supply glitches that are generated by a region of circuitry with simultaneously switching circuit elements can adversely affect sensitive circuits that operate from the same power supply voltage. For example, if a power supply voltage level drops below its normal level, logic gates in sensitive circuitry will experience increased switching delays. These slower switching speeds may cause digital pulses that are being handled by the sensitive circuitry to experience high-to-low and low-to-high signal transitions later in time than expected. Similarly, if the power supply voltage level rises above its nominal level, logic gates in the sensitive circuitry can experience increased switching speeds. In this situation, digital signals may transition at times that are earlier than expected. Timing variations such as these in the digital signal transitions in the sensitive circuitry lead to signal jitter. Jitter can seriously constrain circuit performance, because extra timing margins must be provided to ensure proper operation under worst-case jitter scenarios.

In accordance with an embodiment of the present invention, balancing circuitry is provided that compensates for the glitches produced by the simultaneously switching circuitry. This helps to reduce power supply noise and therefore can reduce signal jitter in sensitive circuits. If desired, the balancing circuitry can be controlled in real time to accommodate changes in the amount of balancing that is needed.

An illustrative integrated circuit on which balancing circuitry for reducing power supply noise may be implemented is shown in FIG. 1. Integrated circuit 10 of FIG. 1 may be, for example, a programmable logic device integrated circuit.

Integrated circuit 10 may have input/output circuitry 12 for driving signals off of device 10 and for receiving signals from other devices via input/output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function. The programmable interconnects associated with interconnection resources may be considered to be a part of programmable logic 18.

Programmable logic device 10 may be based on any suitable programmable technology. With one suitable approach, configuration data (also called programming data) may be loaded into programmable elements 20 using pins 14 and input/output circuitry 12. Once loaded, the programmable elements (also sometimes called configuration bits or programmable function control elements) each provide a static control output signal that controls the state of an associated logic component in programmable logic 18.

As an example, the programmable elements 20 may be random-access memory (RAM) cells that are loaded from an external erasable-programmable read-only memory and control chip via pins 14 and input/output circuitry 12. The loaded programmable elements 20 provide static control signals that are applied to the terminals of circuit elements in programmable logic 18. For example, the programmable elements 20 may provide control signals to the gates of metal-oxide-semiconductor transistors in programmable logic 18 to turn certain transistors on or off and thereby configure the logic in programmable logic 18. The transistors may be used as parts of multiplexers, look-up tables, logic arrays, AND, OR, NAND, and NOR logic gates, etc.

RAM-based programmable logic device technology is merely one illustrative example of the type of technology that may be used to implement programmable logic device 10. Other suitable programmable logic device technologies that may be used for device 10 include arrangements such as those based on programmable logic elements made from fuses or antifuses, programmable logic devices in which elements 20 are formed from electrically-programmable read-only-memory (EPROM) or erasable-electrically-programmable read-only-memory (EEPROM) technology, or programmable logic devices with programmable elements made from magnetic storage elements, etc.

The circuitry of device 10 may be organized using any suitable architecture. As an example, the logic of programmable logic device 10 may be organized in a series of rows and columns of larger programmable logic regions each of which contains multiple smaller logic regions. In some logic devices 10, the larger portions of logic may be referred to as "logic array blocks" (LABs) and the smaller portions of logic may be referred to as logic elements (LEs). The logic elements may each include a programmable look-up table (LUT), one or more registers, one or more programmable multiplexers, and other suitable circuitry (as an example). This is merely one illustrative logic device arrangement 10. The logic of device 10 may be provided using any suitable programmable logic device architecture. Circuitry such as the circuitry of FIG. 1 may also be implemented on other types of integrated circuits if desired.

Figure 2:
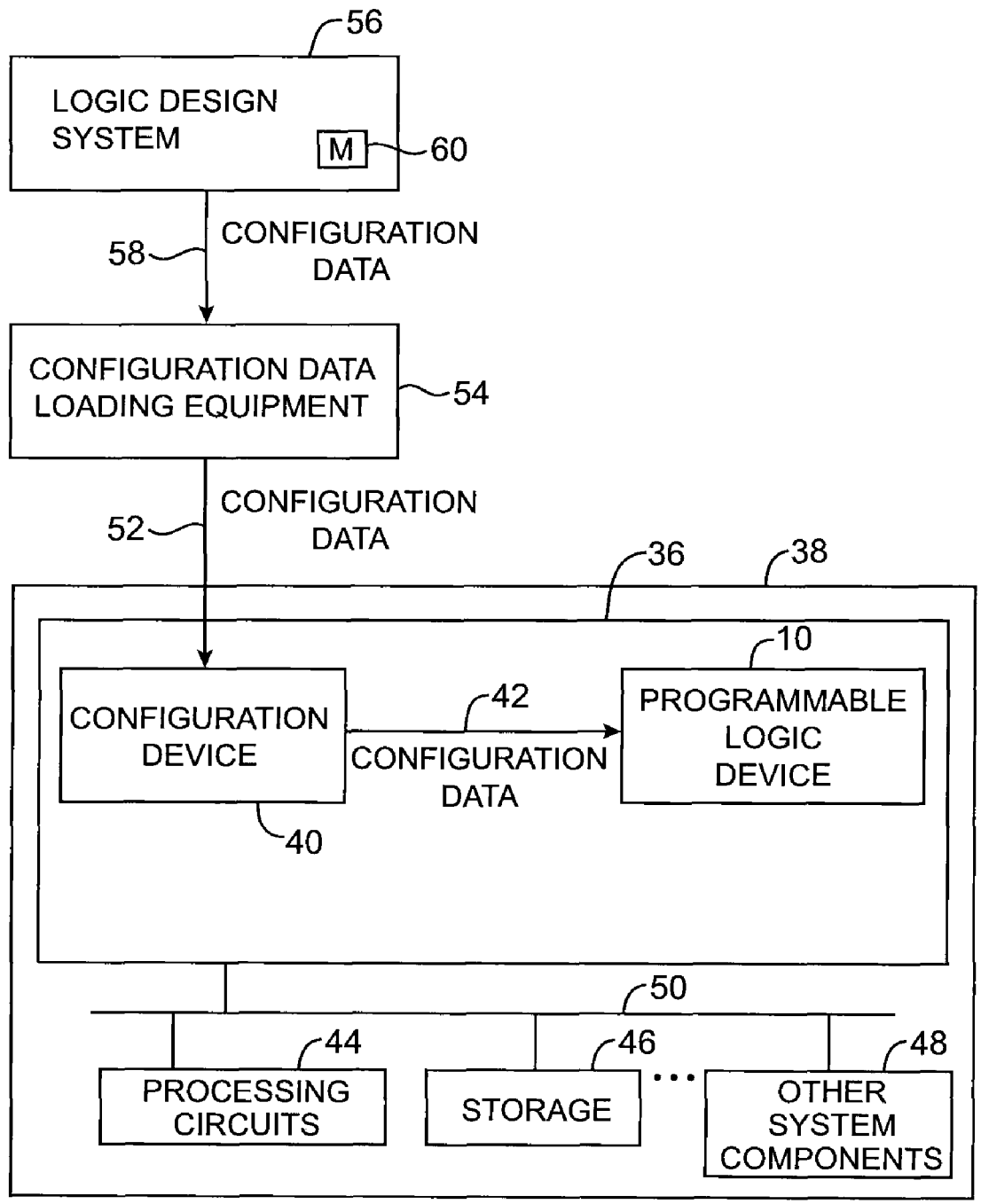
FIG. 2 is a diagram showing how configuration data may be created by a logic design system and loaded into an integrated circuit such as a programmable logic device to configure the device for operation in a system in accordance with an embodiment of the present invention.

An illustrative system environment for a programmable logic device 10 is shown in FIG. 2. Programmable logic device 10 may be mounted on a board 36 in a system 38. Programmable logic device 10 may receive programming data from programming equipment or from any other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10. The circuit 40 may be an erasable-programmable read-only memory (EPROM) chip, a programmable logic device configuration data loading chip with built-in memory (sometimes referred to as a configuration device), or any other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42.

Logic circuit design system 56 includes processing circuitry and storage 60. In supporting design operations involved in implementing a desired custom logic function, the logic design system 56 may use software implemented using circuitry and storage 60 to create configuration data for device 10 that implements balancing circuitry for reducing power supply noise.

Figure 3:
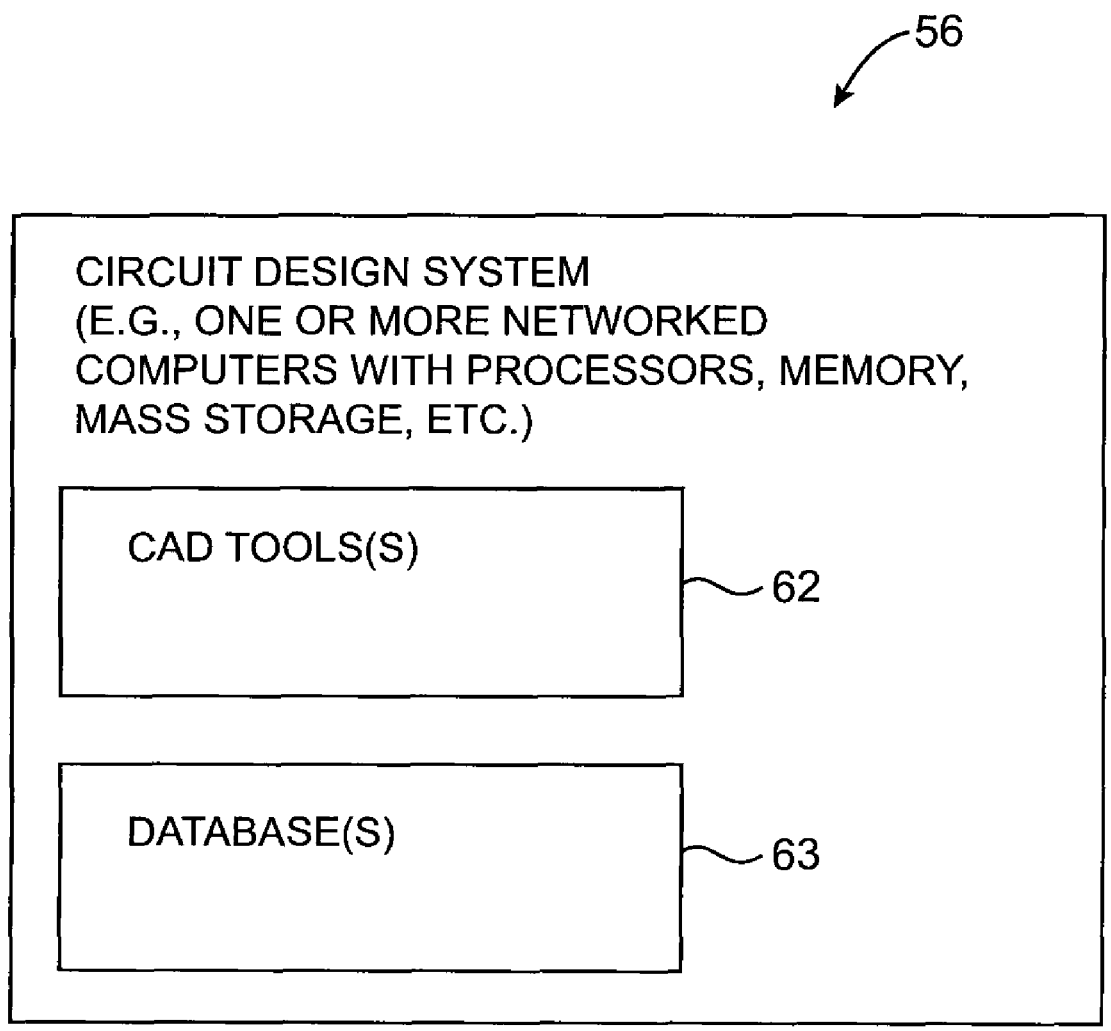
FIG. 3 is a diagram of a circuit design system that may be used to generate configuration data for implementing custom circuit designs in integrated circuits such as programmable logic device integrated circuits in accordance with an embodiment of the present invention.

An illustrative circuit design system 56 in accordance with the present invention is shown in FIG. 3. System 56 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 62 and databases 63 may reside on system 56. During operation, executable software such as the software of computer aided design tools 62 may run on the processor(s) of system 56. Databases 63 may be used to store data for the operation of system 56. In general, software and data may be stored on any computer-readable medium (storage) in system 56. Such storage, which is shown schematically as storage 60 of FIG. 2, may include computer memory chips, removable and fixed media such as hard disk drives, flash memory, compact discs (CDs), DVDs, other optical media, and floppy diskettes, tapes, or any other suitable memory or storage device(s). When the software of system 56 is installed, the storage 60 of system 56 has instructions and data that cause the computing equipment in system 56 to execute various methods (processes). When performing these processes, the computing equipment is configured to implement the functions of the circuit design system.

The computer aided design (CAD) tools 62, some or all of which are sometimes referred to collectively as a CAD tool, may be provided by a single vendor or multiple vendors. Tools 62 may be provided as one or more suites of tools (e.g., a compiler suite for performing tasks associated with implementing a circuit design in a programmable logic device) and/or as one or more separate software components (tools). Database(s) 63 may include one or more databases that are accessed only by a particular tool or tools and may include one or more shared databases. Shared databases may be accessed by multiple tools. For example, a first tool may store data for a second tool in a shared database. The second tool can access the shared database to retrieve the data stored by the first tool. This allows one tool to pass information to another tool. Tools may also pass information between each other without storing information in a shared database if desired.

When a logic designer uses tools 62 to implement a circuit, one or more circuit blocks may contain relatively large number of circuit elements that switch simultaneously. The circuit elements may be any suitable logic gates. For example, the circuit elements may be logic gates associated with logic elements (LEs) in logic array blocks (LABs) on device 10. Logic in the central portion of device 10 that is operated with a relatively low positive power supply voltage is sometimes referred to as core logic. The circuit blocks that contain the relatively large numbers of simultaneously switching circuit elements may be, for example, regions of core logic.

In certain logic designs, the amount of circuitry in a block of core logic that switches simultaneously can be significant. During normal operation of device 10, the simultaneous switching of the circuitry in this core logic can create disruptions in the power supply voltage (e.g., disruptions to a positive core logic power supply voltage of Vccq and to a ground power supply voltage associated with the logic core of Vss). Sensitive core logic that is powered using the same power supply signal (Vccq/Vss) can be affected by the disruptions in the power supply, leading to data signal jitter in the sensitive core logic.

To reduce power supply noise that could lead to signal jitter effects, balancing circuitry may be implemented on integrated circuit. In programmable logic device integrated circuits, the balancing circuitry can be designed by CAD tools 62 during logic design operations and can be implemented by creating appropriate configuration data for loading into the programmable logic device during programming. When the programmable logic device integrated circuit is used in a system, the balancing circuitry can compensate for the disruptions that are caused by the simultaneously switching circuit elements in the core logic, thereby reducing power supply noise and induced signal jitter.

Figure 4:
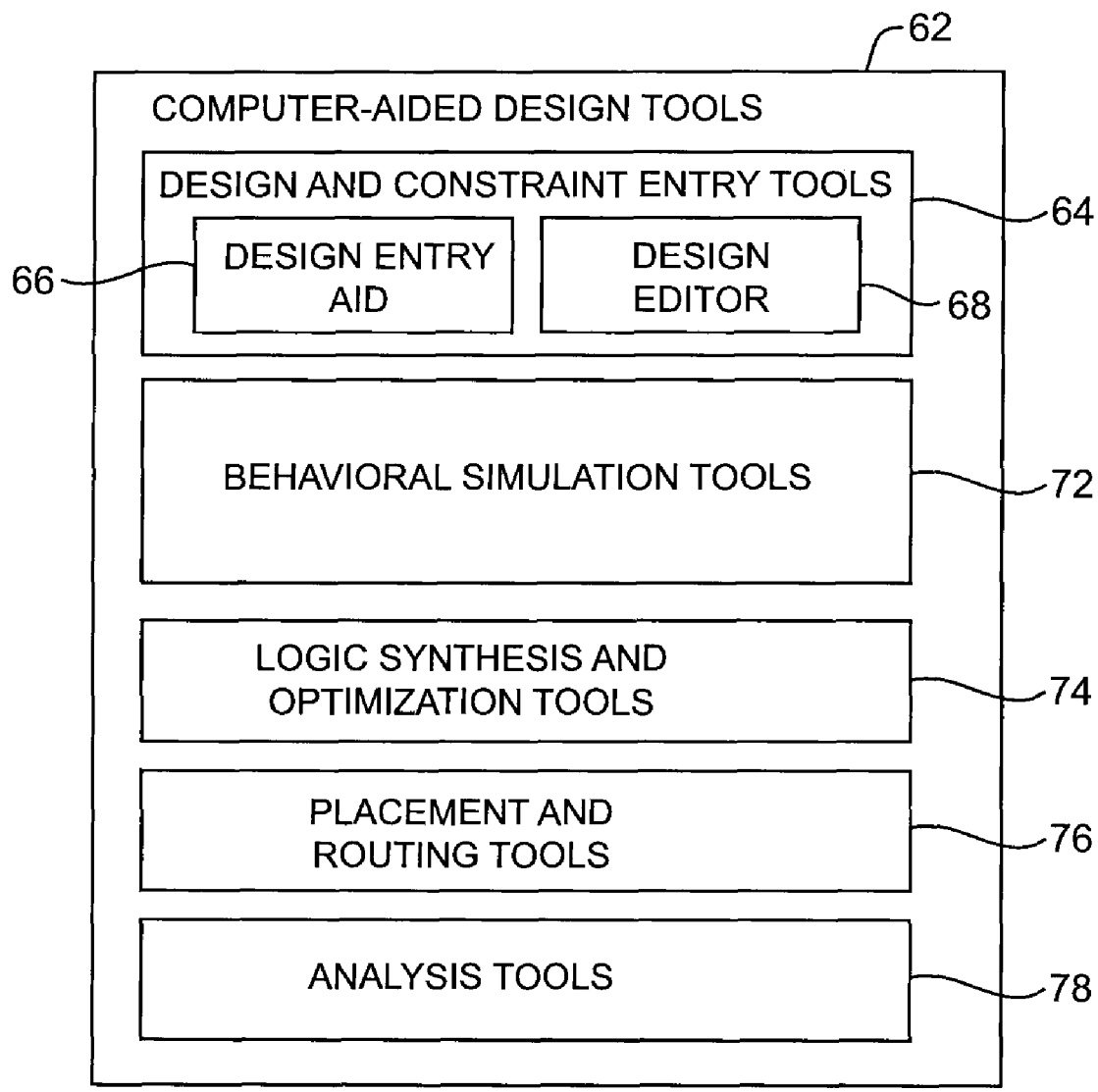
FIG. 4 is a diagram of illustrative computer-aided design (CAD) tools that may be used in a logic design system in accordance with an embodiment of the present invention.

Tools 62 may be used to make resource selections and placement decisions while implementing balancing circuitry for reducing power supply noise and while satisfying design constraints. Illustrative computer aided design tools 62 that may be used in a logic design system such as system 56 of FIGS. 2 and 3 are shown in FIG. 4.

The design process typically starts with the formulation of logic circuit functional specifications. A logic designer can specify how a desired circuit should function using design and constraint entry tools 64. Design and constraint entry tools 64 may include tools such as design and constraint entry aid 66 and design editor 68. Design and constraint entry aids such as aid 66 may be used to help a logic designer locate a desired design from a library of existing logic designs and may provide computer-aided assistance to the logic designer for entering (specifying) the desired design. As an example, design and constraint entry aid 66 may be used to present screens of options for a user. The user may click on on-screen options to select whether the circuit being designed should have certain features. Design editor 68 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 64 may be used to allow a logic designer to provide a desired logic design using any suitable format. For example, design and constraint entry tools 64 may include tools that allow the logic designer to enter a logic design using truth tables. Truth tables can be specified using text files or timing diagrams and may be imported from a library. Truth table logic design and constraint entry may be used for a portion of a large circuit or for an entire circuit.

As another example, design and constraint entry tools 64 may include a schematic capture tool. A schematic capture tool may allow the logic designer to visually construct logic circuits from constituent parts such as logic gates and groups of logic gates. Libraries of preexisting logic circuits may be used to allow a desired portion of a design to be imported with the schematic capture tools.

If desired, design and constraint entry tools 64 may allow the logic designer to provide a logic design to the logic design system 10 using a hardware description language such as Verilog hardware description language (HDL) or Very High Speed Integrated Circuit Hardware Description Language (VHDL). The designer of the logic circuit can enter the logic design by writing hardware description language code with editor 68. Blocks of code may be imported from user-maintained or commercial libraries if desired.

Techniques such as these may be used in designing regions of core logic. Corresponding balancing circuitry for reducing power supply noise may be manually created by a circuit designer, may be imported from a library, may be implemented automatically by tools 62, or may use other suitable arrangements or a combination of these arrangements.

After the design has been entered using design and constraint entry tools 64, behavioral simulation tools 72 may be used to simulate the functional performance of the design. If the functional performance of the design is incomplete or incorrect, the logic designer can make changes to the design using design and constraint entry tools 64. The functional operation of the new design can be verified using behavioral simulation tools 72 before synthesis operations have been performed using tools 74. Simulation tools such as tools 72 may also be used at other stages in the design flow if desired (e.g., after logic synthesis). The output of the behavioral simulation tools 72 may be provided to the logic designer in any suitable format (e.g., truth tables, timing diagrams, etc.).

Once the functional operation of the logic design has been determined to be satisfactory, logic synthesis and optimization tools 74 may be used to implement the logic design in a particular programmable logic device (i.e., in the logic and interconnect resources of a particular programmable logic device product or product family).

Tools 74 attempt to optimize the design by making appropriate selections of hardware to implement different logic functions in the logic design based on the logic design data and constraint data entered by the logic designer using tools 64.

After logic synthesis and optimization using tools 74, the logic design system may use tools such as placement and routing tools 76 to perform physical design steps (layout synthesis operations). Placement and routing tools 76 are used to determine how to place the circuits for each logic function within the programmable logic device. For example, if two counters interact with each other, the placement and routing tools 76 may locate these counters in adjacent logic regions on the programmable logic device to minimize interconnect delays. The placement and routing tools 76 create orderly and efficient implementations of logic designs for a given programmable logic device. Tools such as tools 74 and 76 may be part of a compiler suite (e.g., part of a suite of compiler tools provided by a programmable logic device vendor).

In accordance with an embodiment of the present invention, tools such as tools 62 may be used in manually and automatically determining the effects of simultaneously switching signals in blocks of core logic and in compensating for such effects using balancing circuitry. This allows tools 62 to minimize power supply noise (e.g., power supply noise due to many circuit elements in a region of core logic switching simultaneously) while satisfying design constraints.

After an implementation of the desired logic design in the programmable logic device has been generated using placement and routing tools 76, the implementation of the design may be analyzed and tested using analysis tools 78. After satisfactory optimization operations have been completed using tools 62, tools 62 can produce the configuration data for the programmable logic device.

Figure 5:
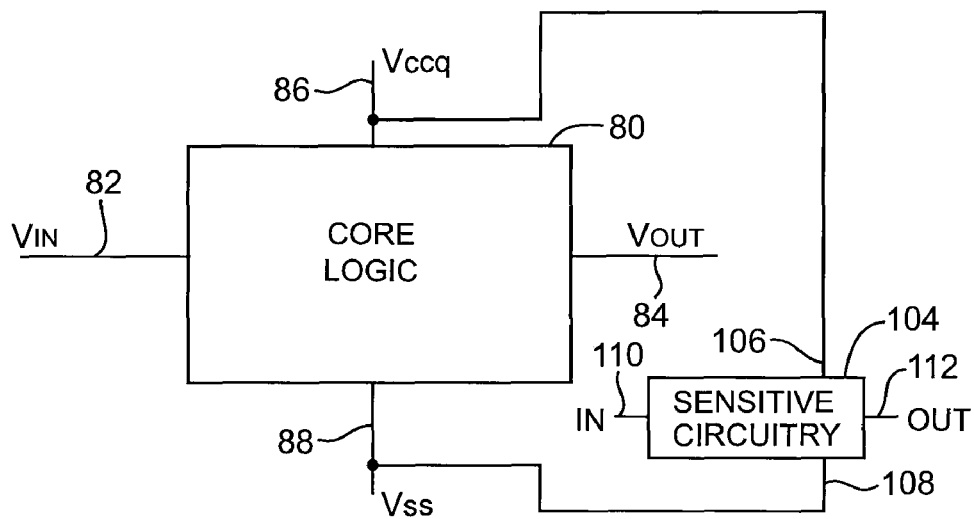
FIG. 5 is a diagram of core logic on a portion of a conventional integrated circuit showing how the core logic may be powered by a positive power supply voltage and a ground power supply voltage.

The production of power supply noise due to simultaneously switching circuit elements is described in connection with FIGS. 5 and 6. As shown in FIG. 5, a region of core logic 80 on a conventional integrated circuit may receive one or more input signals Vin on input paths such as input path 82 and may produce one or more output signals Vout on output paths such as output path 84. Core logic 80 may be powered using a positive power supply voltage Vccq and a ground power supply voltage Vss. Positive power supply voltage Vccq may be supplied to core logic 80 on path 86. Ground voltage Vss may be supplied to core logic 80 using path 88. In a typical arrangement, positive power supply voltage Vccq might be 1.0 volts and ground voltage Vss might be 0 volts.

Core logic 80 may contain a number of circuit elements that switch simultaneously. For example, core logic 80 may contain numerous memory elements that are addressed simultaneously. As another example, core logic 80 may contain a numerous programmable logic elements (LEs) or other components that are switched at the same time. In another example, core logic 80 may contain numerous AND gates, inverters, or other logic gates that are driven by signal Vin and that switch simultaneously in response to changes in Vin.

In situations such as these, the circuit elements (e.g., the memory elements, logic elements, logic gates, or other components in core logic 80) may switch simultaneously because they all receive the same signal or signals Vin or because they are all performing related operations. The circuit elements may, for example, be clocked using a common clock and/or may be driven by one or more signals that are synchronized to a common clock (or closely related clocks). An illustrative signal Vin that is used to drive circuit elements in core logic 80 is shown in FIG. 6. As shown in FIG. 6, signal Vin may be a digital signal that is characterized by positive and negative transitions. There may be an equal number of equally spaced positive and negative transitions (e.g., when Vin is a clock signal), or negative and positive transitions may occur at a variety of different times (e.g., when Vin is a data signal). Regardless of whether the signals driving core logic 80 are clock signals, data signals, or a combination of clock and data signals, logic gates and other circuit elements in core logic 80 switch at substantially the same time, because the circuit elements are driven by signals that are synchronized or are otherwise closely related to each other.

Figure 6:
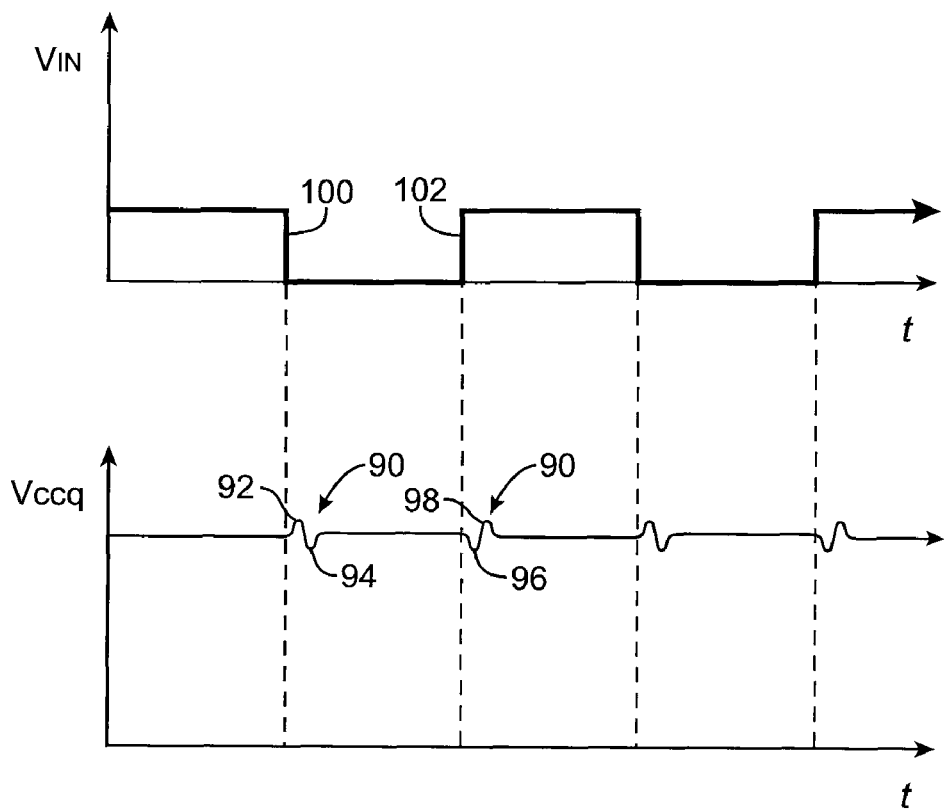
FIG. 6 shows graphs of input signals and corresponding power supply fluctuations that may be associated with conventional core logic of the type shown in FIG. 5.

As a result of the simultaneous switching of these circuit elements, glitches 90 are created on the power supply voltage Vccq, as shown in the lower trace of FIG. 6. Ground signal Vss may also be disrupted by the simultaneous switching of the input signals to core logic 80. The glitches associated with falling signal edges such as falling signal edge 100 of signal Vin are typically characterized by a relatively larger positive component 92 and a relatively smaller negative component 94. The glitches associated with rising signal edges such as rising signal edge 102 of signal Vin are typically characterized by a relatively larger negative component 96 and a relatively smaller positive component 98.

In addition to powering core logic 80 of FIG. 5, the power supply that supplies power to core logic 80 may supply power to sensitive circuitry 104 on the same integrated circuit. Positive power supply voltage Vccq may be provided to sensitive circuitry 104 via path 106. Ground power supply voltage Vss may be supplied to sensitive circuitry 104 via path 108. Sensitive circuitry 104 may be part of the core logic of the integrated circuit on which core logic 80 is formed. Logic gates or other electrical components in sensitive circuitry 104 may be affected by glitches in the power supply voltage. When the power supply voltage is higher than usual (e.g., due to an increase in voltage Vccq such as increase 92), the gates in circuitry 104 may switch more rapidly than normal. When the power supply voltage is lower than usual (e.g., due to a decrease in voltage Vccq such as decrease 96), the gates in circuitry 104 may switch more slowly than usual. These variations in the timing performance of the logic in circuitry 104 produce signal jitter. When signal jitter is present, the rising and falling edges of signals at output 112 of sensitive circuitry 104 will be shifted in time with respect to the rising and falling edges of the signals provided to input 110. These unpredictable timing variations may force a logic designer to slow the system clock or otherwise modify the circuit design for sensitive circuitry 104 and core logic 80, thereby reducing performance.

In accordance with an embodiment of the present invention, balancing circuitry may be included on an integrated circuit to compensate for the glitches produced by the simultaneously switching circuits and thereby reduce power supply noise. Because noise is reduced, signal jitter will be minimized and device performance can be enhanced.

Figure 7:
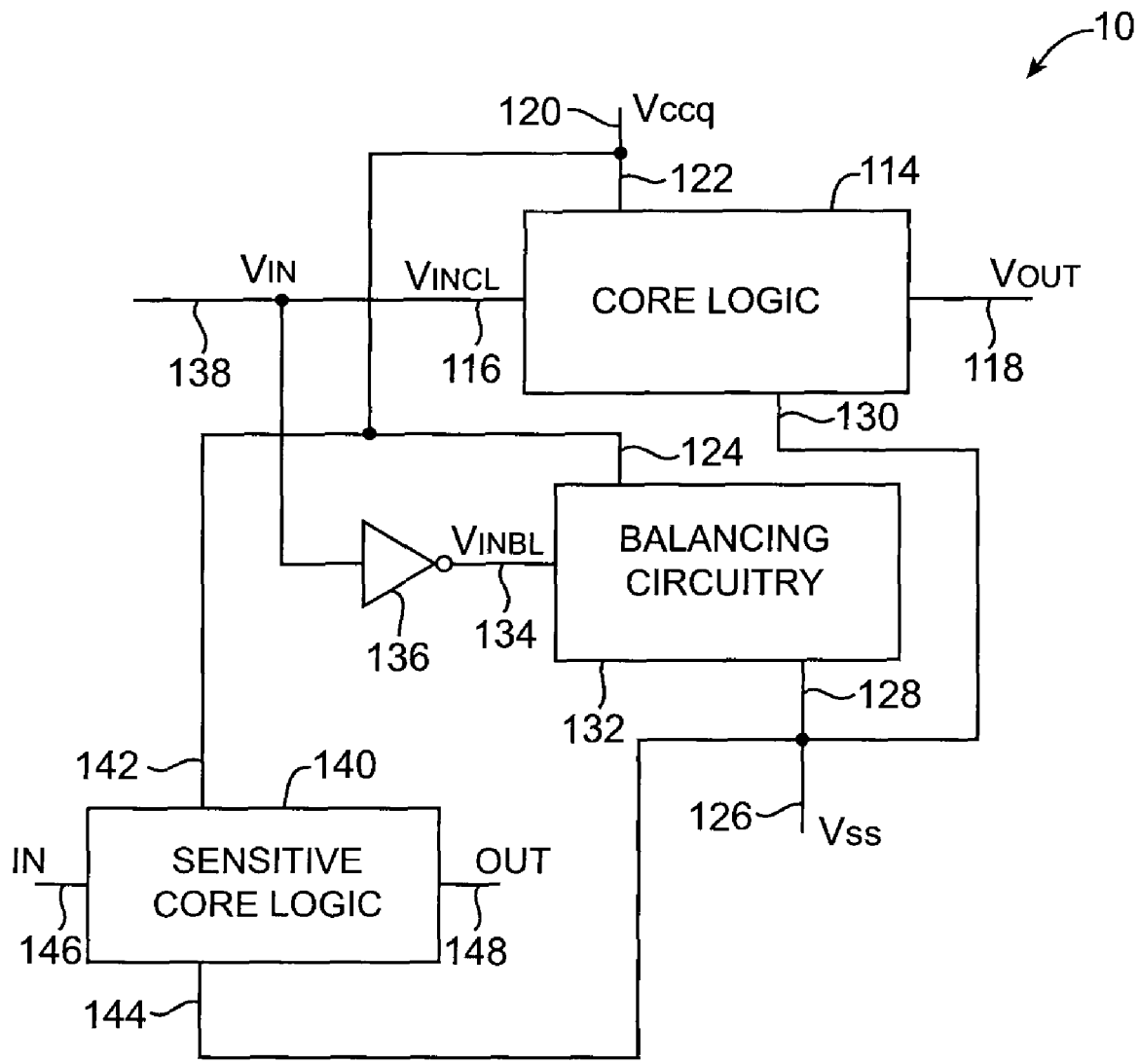
FIG. 7 is a diagram of core logic on a portion of an integrated circuit and corresponding balancing circuitry on the integrated circuit that may be used to reduce power supply noise and associated signal jitter in sensitive circuitry on the integrated circuit in accordance with an embodiment of the present invention.

An illustrative integrated circuit 10 that contains balancing circuitry is shown in FIG. 7. As shown in FIG. 7, integrated circuit 10 may receive a positive power supply voltage Vccq at one or more positive power supply terminals such as positive power supply terminal 120 and may receive ground power supply voltage Vss at one or more ground power supply terminals such as ground power supply terminal 126. Power supply voltages Vccq and Vss may be, for example, 1.0 volts and 0 volts, respectively. If desired, integrated circuit 10 may use other power supply voltage levels (e.g., positive power supply voltages greater than or less than 1.0 volts, ground power supply voltages greater than or less than 0 volts, etc.). Power supply voltages may be supplied using external voltage sources or may be generated on-chip (e.g., using voltage divider circuitry, charge pump circuitry, or other power regulator circuitry.).

Integrated circuit 10 may have one or more portions of circuitry that include simultaneously switching components. In the example of FIG. 7, integrated circuit 10 is shown as having a region of core logic 114. Core logic 114 may include numerous simultaneously switched logic gates or other circuit components. For example, core logic 114 may contain numerous AND gates, numerous OR gates, numerous registers, numerous memory elements, numerous programmable logic elements (LEs), or other circuits that simultaneously switch during operation of integrated circuit 10. Simultaneous switching may result when circuit elements are clocked using a common clock or related clocks, when circuit elements receive the same or related data signals, etc. These common clock and data signals are represented schematically as signals Vin.

As shown in FIG. 7, signals Vin may be provided to the circuitry of FIG. 7 at input path 138. In the example of FIG. 7, signals Vin are routed to input 116 of core logic 114 and serve as core logic input signals Vincl. Signals Vin and Vincl may include any suitable number and combination of clock signals and data signals. Resulting output signals that are produced by core logic 114 in response to input signals Vincl are represented as signals Vout on output path 118. Signals Vout may include any suitable output signals (e.g., data signals processed by core logic 114, clock signals, etc.).

Integrated circuit 10 may have sensitive circuitry such as sensitive core logic 140 that is powered by the same power supply that is used for powering core logic 114. Balancing circuitry 132 may be implemented on integrated circuit 10 to reduce power supply noise due to the simultaneous switching of core logic 114.

Positive power supply voltage Vccq on input 120 may be received at core logic positive power supply input 122, balancing circuitry positive power supply input 124, and sensitive core logic positive power supply terminal 142. Ground power supply voltage Vss, which is received at ground terminal 126, is also shared between core logic 114, balancing circuitry 128, and sensitive core logic 140. Input 130 of core logic 114 is used to receive ground power supply signal Vss, input 128 of balancing circuitry 132 is used to receive ground power supply signal Vss, and input 144 of sensitive core logic 140 is used to receive ground power supply signal Vss.

Because core logic 114 contains circuit components that switch simultaneously, the operation of core logic 114 can create power supply glitches. The power supply signal in circuit 10 is shared between core logic 114 and sensitive core logic 140, so the glitches that are generated by the operation of core logic 114 are passed to sensitive core logic 140 via power supply inputs 142 and 144. During operation of sensitive core logic 140, input signals are received at input paths such as path 146 and corresponding output signals are provided at output paths such as path 148. When glitches are present on the power supply used for sensitive core logic, the signals provided at output 148 may include undesirable levels of signal jitter.

Balancing circuitry 132 may be used to reduce power supply noise by compensating for the simultaneous switching activity of core logic 114. As shown in FIG. 7, balancing circuitry 132 may receive input signals Vinbl on input paths such as input path 134. No outputs are needed, because balancing circuitry 132 generally need not provide any data or clock signals to other portions of integrated circuit 10. As indicated by inverter 136, signals Vinbl may be inverted relative to the signals Vincl that are used in switching core logic 114. Inverters such as inverter 136 may be implemented using one or more inverters, using inverting logic in one or more logic gates in balancing circuitry 132 or other circuitry on integrated circuit 10, or using any other suitable circuit configuration. Balancing circuitry 132 may be implemented using substantially identical circuitry to the circuitry of core logic 114 or using circuitry that is equivalent in its effect (e.g., switching the same amount of current) as core logic 114.

When a rising signal edge is presented to core logic 114, a falling signal edge is presented to balancing circuitry 132 due to the inversion of inverting circuitry such as inverter 136. As a result, the circuit elements in balancing circuitry 132 may switch 180° out of phase with the circuit elements in core logic 114. This causes the power supply noise effects from core logic 114 and balancing circuitry 132 to cancel each other out, thereby reducing power supply noise for sensitive core logic 140. (The amount of circuitry in sensitive core logic 140 is generally assumed to be small enough relative to the amount of circuitry in core logic 114 that the power supply noise produced by logic 140 can be neglected).

Figure 8:
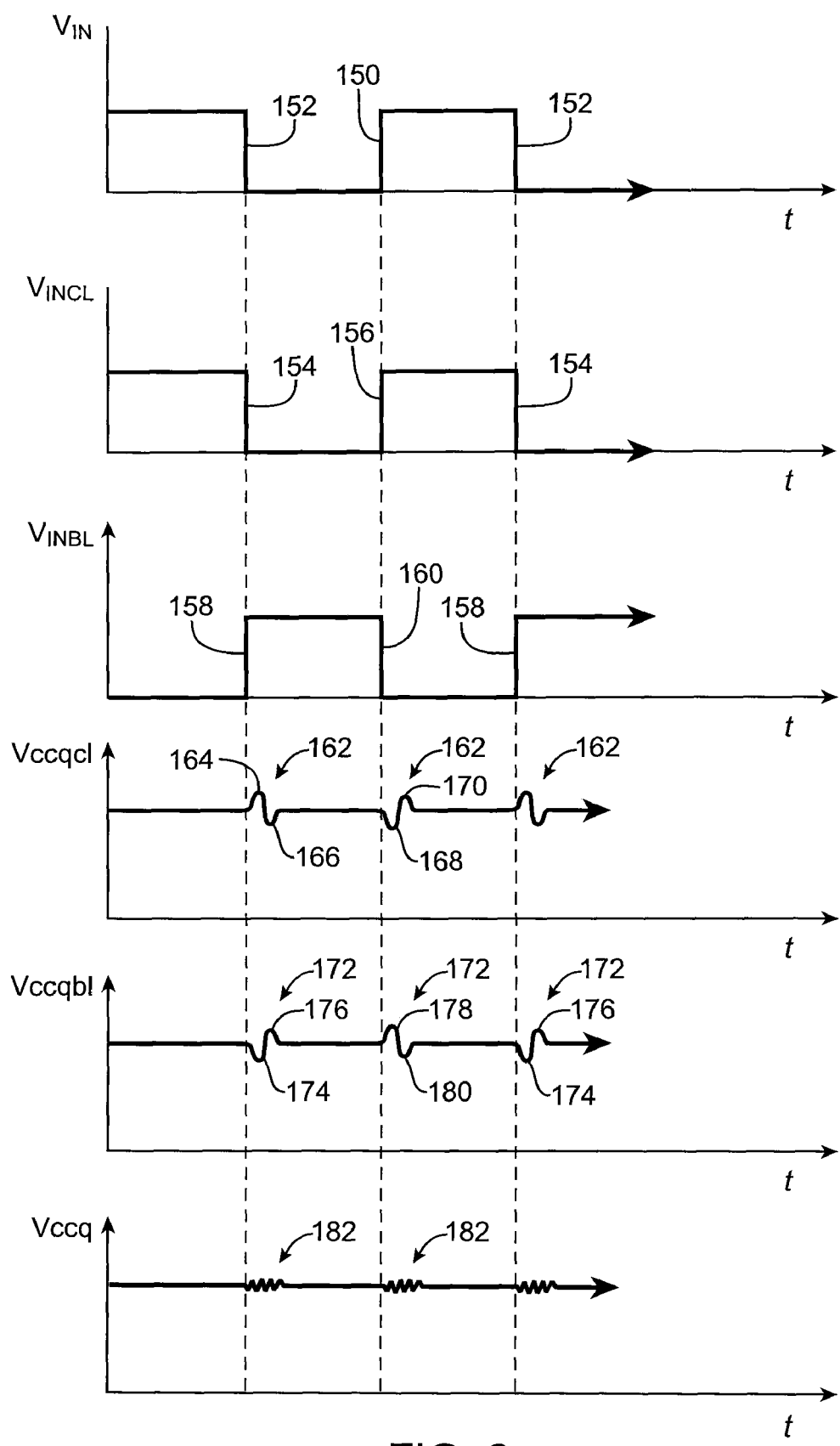
FIG. 8 shows graphs of signals and corresponding power supply fluctuations that may be associated with core logic and balancing circuitry on an integrated circuit of the type shown in FIG. 7 in accordance with an embodiment of the present invention.

The power supply noise reduction capabilities of balancing circuitry 132 are illustrated in the graphs of FIG. 8. As shown in the first (uppermost) trace of FIG. 8, signals Vin may be characterized by rising edges 150 and falling edges 152. Signals Vin need not be square wave signals. For example, signals Vin may be data signals. For illustrative purposes, signals Vin (and the other signals in FIG. 8) are represented as square waves. Signals Vin may have any suitable frequency (e.g., 100 MHz to 1 GHz, less than 100 MHz, more than 1 GHz, etc.).

As shown in the second trace of FIG. 8, signals Vincl at input path 116 to core logic 114 may be identical to signals Vin on path 138, so that falling edges 154 of signals Vincl coincide with falling edges 152 of signals Vin and rising edges 156 of signals Vincl coincide with rising edges 150 of signal Vin. Signals Vinbl may be complementary to signals Vincl, as shown in the third trace of FIG. 8. As a result, rising edges 158 of signals Vinbl coincide with falling signal edges 152 and 154 of signals Vin and Vincl and falling edges 160 of signal Vinbl coincide with rising signal edges 150 and 156 of signals Vin and Vincl.

As described in connection with FIG. 6, the signal edges of signals Vincl that are provided to core logic 114 give rise to power supply signal glitches. This is illustrated by the signal Vccqcl in the fourth trace of FIG. 8. The signal Vccqcl shows how noise such as glitches 162 may be impressed upon power supply signal Vccq due to the simultaneous switching of the circuit elements in core logic 114. Glitches 162 that corresponding to falling signal edges such as edges 154 are characterized by momentary voltage increases 164 followed by relatively smaller voltage decreases 166. Glitches 162 that correspond to rising signal edges such as edges 156 are characterized by momentary voltage decreases 168 followed by relatively smaller voltage increases 170.

The power supply glitching behavior produced by the operation of balancing circuitry 132 is essentially opposite to that of core logic 122. This is illustrated by the signal Vccqbl in the fifth trace of FIG. 8. The signal Vccqbl shows how noise such as glitches 172 may be impressed upon power supply signal Vccq due to the switching of the circuit elements in balancing logic 132 (e.g., the simultaneous switching of numerous elements of the type used in core logic 114). The balancing logic glitches 172 that corresponding to falling signal edges such as edges 160 of signals Vinbl are characterized by momentary voltage increases 178 followed by relatively smaller voltage decreases 180. Glitches 172 that correspond to rising signal edges in signals Vinbl such as edges 158 are characterized by momentary voltage decreases 174 followed by relatively smaller voltage increases 176.

Signals Vinbl at input path 134 to balancing circuitry 132 are inverted relative to signals Vincl at input 116 of core logic 114, so the negative portions of glitches 172 such as portions 174 and 180 tend to cancel the positive portions of glitches 162 such as portions 164 and 170. Similarly, the positive portions of glitches 172 such as portions 176 and 178 tend to cancel the negative portions of glitches 162 such as portions 166 and 168. As a result of these cancellations, power supply noise on power supply line Vccq may be eliminated or reduced. This is illustrated by the relatively small size of the residual glitches 182 on power supply voltage Vccq in the sixth trace of FIG. 8. Sensitive core logic 140 is powered using the power supply voltage Vccq, so the use of balancing circuitry 132 to cancel out the noise from the simultaneous switching of circuit elements in core logic 114 helps minimize signal jitter in the output signals on path 148 of sensitive core logic 140.

When determining the appropriate strength needed for balancing circuitry 132, it is generally desirable to consider the fraction of circuit elements in core logic 114 that switch in phase with signal Vincl and the fraction of circuit elements in core logic 114 that switch 180° out of phase with signal Vincl. Consider, as an example, a situation in which core logic 114 contains M+N gates that are handling square wave input signals and in which M of the gates have rising edges and N of the gates have falling edges at a given point of time. In this situation, the N gates with falling signal edges internally balance out the M gates with rising signal edges, so balancing circuitry 132 should be implemented with sufficient strength to compensate for the noise produced by M−N simultaneously switching gates.

When there is more than one region of core logic on an integrated circuit that has simultaneously switching circuit elements, the number of circuit elements in each of these regions may be taken into account when determining how to construct suitable balancing circuitry on the integrated circuit. Consider, as an example, the scenario of FIG. 9. In this type of situation, integrated circuit 10 contains two regions of core logic: core logic A and core logic B. Core logic B may be a region of sensitive circuitry such as sensitive circuitry 140 of FIG. 7 or, if the contribution of the sensitive circuitry 140 to the simultaneous switching circuit elements is negligible, core logic B may be another region of core logic. Each region of core logic on integrated circuit 10 may be characterized by a suitable simultaneous switching strength metric. For example, core logic A may be characterized by the number of circuit elements (M) that switch on the rising edges of input signal Vin and the number of circuit elements (N) that switch on the falling edges of input signal Vin. Similarly, core logic B may be characterized by the number of circuit elements (K) that switch on the rising edges of input signal Vin and the number of circuit elements (L) that switch on the falling edges of input signal Vin.

Figure 9:
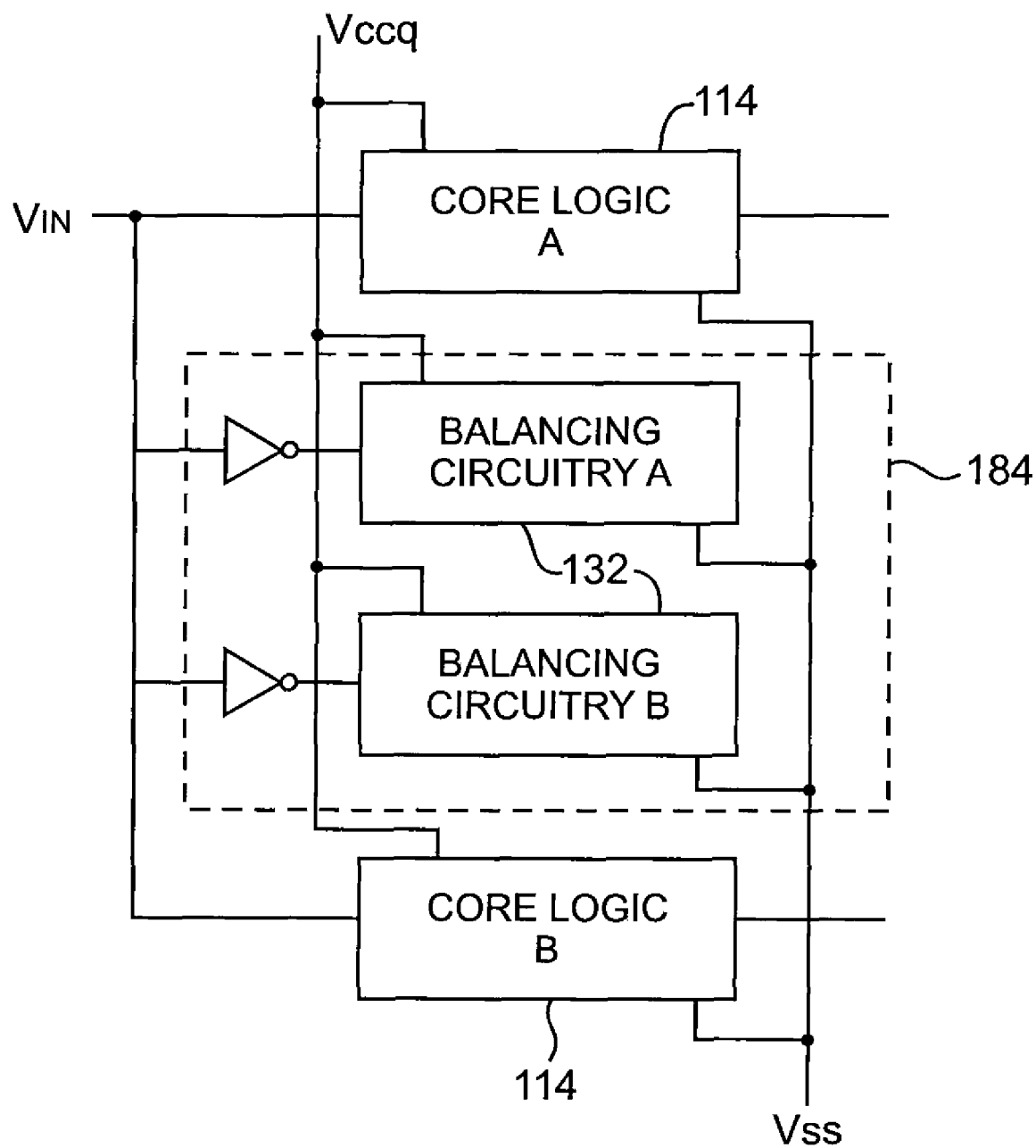
FIG. 9 is a diagram of two regions of core logic on an integrated circuit and corresponding balancing circuitry that may be used to reduce power supply noise in accordance with an embodiment of the present invention.

Balancing logic A may be implemented with a sufficient number of balancing circuit elements to balance the net number of circuit elements in core logic A that switch on the rising signal edges of Vin (i.e., the strength of balancing logic A may be proportional to M−N). Balancing logic B may be implemented with a sufficient strength to balance the net number of circuit elements in core logic B that switch on the rising signal edges of Vin (i.e., K−L). As shown in FIG. 9, the circuitry of balancing logic A and balancing logic B may be combined as balancing logic 184 (i.e., with strength M−N+K−L).

The amount of balancing circuitry that should be actively switched on each signal transition may vary as a function of time (i.e., the balancing circuitry can include sufficient resources to balance M(t)−N(t)+K(t)−L(t), where M(t), N(t), K(t), and L(t) are functions of time). For example, there may be a net of X circuit elements in core logic 114 that switch simultaneously for a first period of 1000 clock cycles and a net of Y circuit elements in core logic 114 that switch simultaneously for a second period of 1000 clock cycles. In this type of scenario, the balancing circuitry may be controlled so that it has a balancing strength of X circuit elements for an initial period of 1000 clock cycles followed by a balancing strength of Y circuit elements for a subsequent period of 1000 clock cycles.

Control circuitry may be used to adjust the amount of balancing that is provided by balancing circuitry 132 as a function of time. Any suitable control circuitry may be used for balancing circuitry 132 if desired. An illustrative arrangement in which control circuitry is implemented using a memory array and an associated memory controller is shown in FIG. 10.

Figure 10:
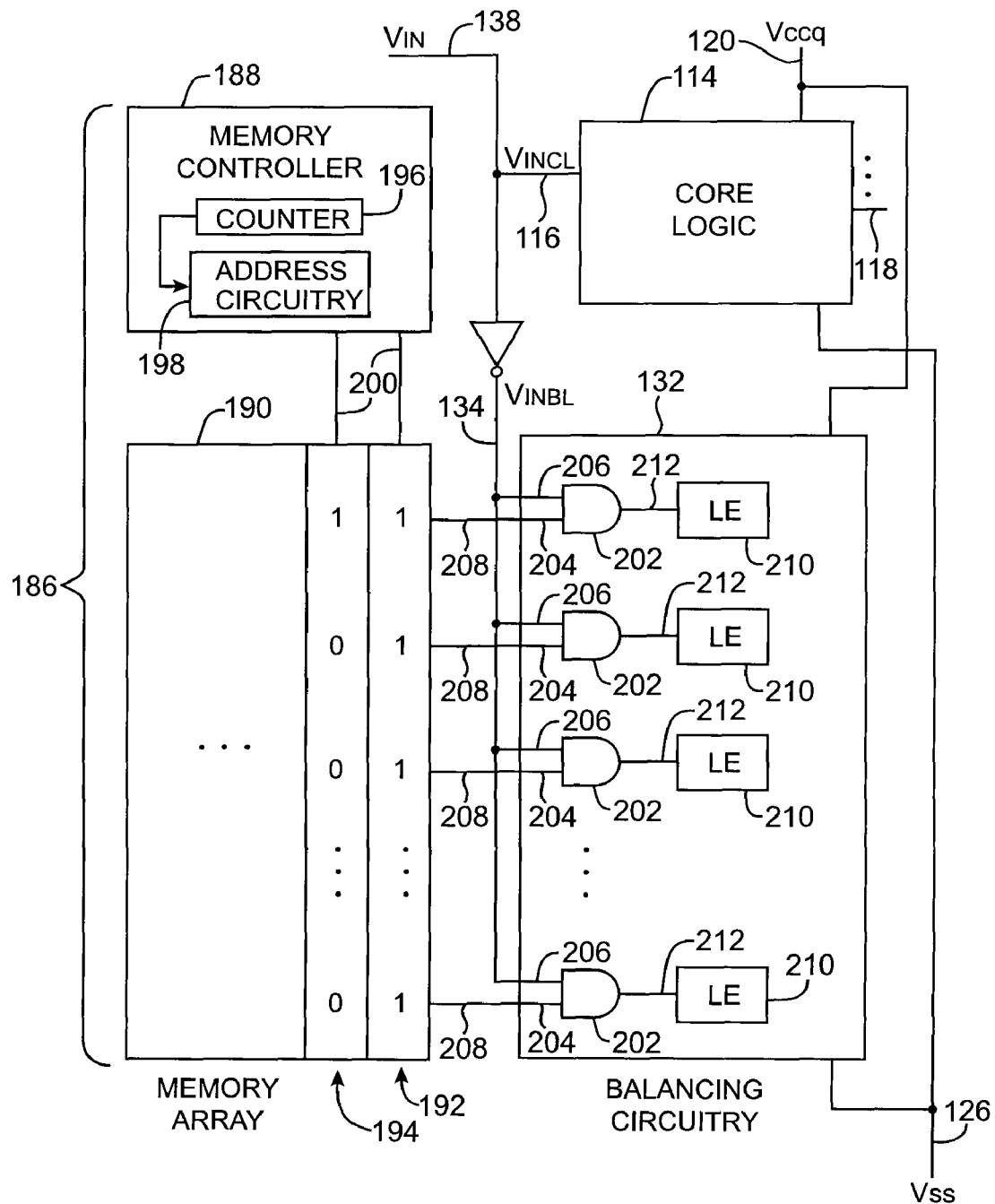
FIG. 10 is a diagram of core logic on an integrated circuit and corresponding balancing circuitry with time-dependent control circuitry that may be used to reduce power supply noise in accordance with an embodiment of the present invention.

As shown in FIG. 10, integrated circuit 10 may have core logic 114 and balancing circuitry 132 that are powered using a common power supply signal. Core logic 114 may contain a number of simultaneously switching circuit elements. Balancing circuitry 132 may contain circuit elements that are driven using signals Vinbl that are complementary to the input signals Vincl to core logic 114.

Control circuitry 186 may be used to control the strength of balancing circuitry 132 in real time. Control circuitry 186 may include a memory array 190. Memory array 190 may, for example, include rows and columns of random-access-memory (RAM) cells or other suitable memory elements. Memory array 190 may be controlled using memory controller 188. Memory controller 188 may include a counter such as counter 196 and address circuitry 198. Counter 196 may produce an output that directs address circuitry 198 to systematically assert selected address lines 200.

Each of address lines 200 may be associated with a respective column of memory elements in array 190. When a given address line is asserted, the contents of the memory elements associated with that address line may be routed to memory array output lines 208. There may be a memory array output line 208 associated with each row in memory array 190. As the address lines 200 are asserted systematically, different sets of control data are provided to control lines 208. In the example of FIG. 10, the rightmost column (column 192) of memory array 190 is filled with logic ones. When the rightmost address line 200 is asserted, each control line 208 will therefore receive an associated logic high control signal (e.g., a control signal at Vccq). In column 194 of array 190, all memory elements except the memory element in the first row are filled with logic zeros). As a result, when the address line 200 that is associated with column 194 is asserted, the uppermost control line 208 will receive a logic one, whereas the remaining control lines 208 will receive logic zeros. As each column of memory array 190 is addressed in this way, a different pattern of ones and zeros is conveyed to balancing circuitry 132 on control lines 208.

Control lines 208 may be connected to the inputs of AND gates 202. Logic gates such as AND gates 202 may be used as control gates for balancing circuitry 132. When the control signal on a given AND gate input 204 is high, the AND gate is enabled and will pass signals from its input 206 to its output 212. When the control signal on a given AND gate is low, the AND gate is disabled and will not pass any input signals to its output 212.

The outputs of control gates 202 may be conveyed to suitable circuitry in balancing circuitry 132. In the example of FIG. 10, balancing circuitry 132 has been implemented using a number of programmable logic elements (LEs) 210. When the control signal on the output 212 of a given control gate 202 is high (or transitions high), the associated logic element will switch and will therefore contribute to the balancing strength of balancing circuitry 132. When the control signal on the output 212 of a given control gate 202 is low (or is not transitioning from low to high), the associated logic element will not switch. When a logic element 210 remains inactive in this way, the logic element will not contribute to the balancing strength of balancing circuitry 132. Using control circuitry 186, the number of switched logic elements in balancing circuitry 132 can be controlled as a function of time to match the time-dependent balancing needs of core logic 114.

The example of FIG. 10, in which the components of balancing circuitry 132 have been implemented using programmable logic resources (e.g., logic elements 210) is merely illustrative. Balancing circuitry 132 may be implemented using any suitable circuitry. For example, balancing circuitry 132 may contain one or more current sources that may be controlled in real time using analog or digital control signals, balancing circuitry 132 may be implemented using a block of programmable logic that is constructed using circuit elements that are identical to or that are different from the simultaneously switching circuit components in core logic 114, etc.

Figure 11:
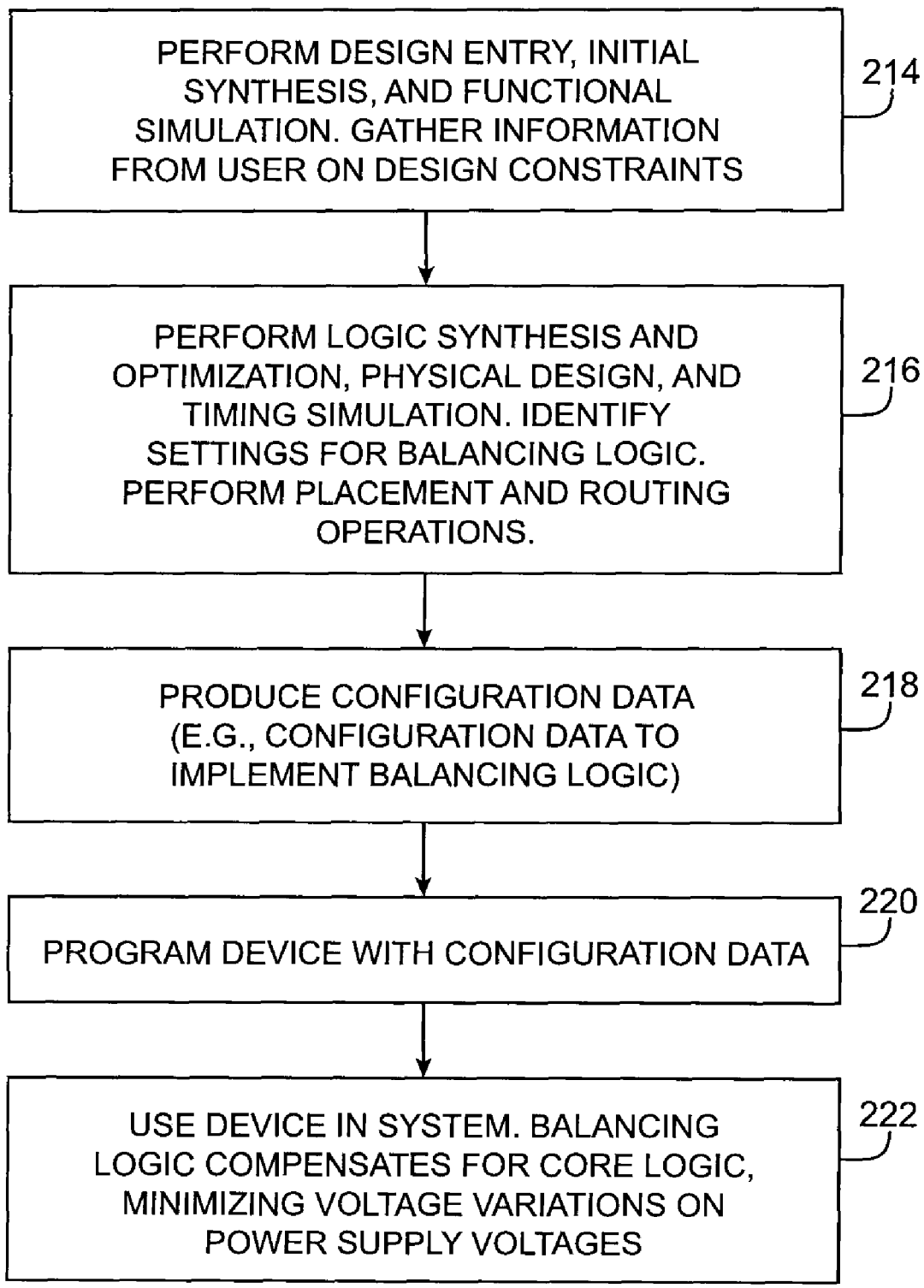
FIG. 11 is a flow chart of steps involved in designing, implementing, and using an integrated circuit with balancing circuitry that reduces power supply noise in accordance with an embodiment of the present invention.

A flow chart of illustrative steps involved in implementing and using balancing circuitry to reduce power supply noise on an integrated circuit that contains simultaneously switching core logic is shown in FIG. 11. During the steps of FIG. 11, CAD tools 62 may be used to implement balancing circuitry in an integrated circuit such as a programmable logic device integrated circuit.

At step 214, tools such as design and constraint entry tools 64 use input screens to obtain a desired custom logic design from a logic designer. The design may include design constraints such as timing constraints, signal strength constraints, logic function constraints, etc.

During step 214, a user can specify constraints for the integrated circuit that is being designed such as maximum jitter levels and other timing constraints, power supply noise limits, desired power supply voltages, etc. For example, a user may inform tools 62 of a requirement or preference that a particular circuit path operate at a particular minimum speed or maximum delay or may specify that a particular block of sensitive core logic should not experience more than a given amount of signal jitter due to power supply noise. If desired, settings such as these may be provided as defaults (e.g., when a user does not specify any such constraints).

At step 216, logic synthesis and optimization, physical design, and timing simulation operations may be performed using tools 72, 74, 76, and 78. During these operations, the CAD tools 62 process the design constraints obtained at step 214 and produce a design implementation for the programmable logic device integrated circuit. In particular, the CAD tools identify blocks of circuitry with simultaneously switching circuit elements (e.g., blocks such as core logic 114 of FIG. 10), compute how many circuit elements switch as a function of time (e.g., computing M(t) and N(t) for logic 114), and compute how much balancing circuitry 132 should be implemented to handle the expected simultaneous switching load produced by the simultaneously switching circuit elements. The CAD tools allocate resources and perform placement operations to ensure that the implementation of the desired custom logic circuit satisfies design constraints and to ensure that sufficient balancing circuitry (including its associated control circuitry such as control circuitry 186) is implemented within the integrated circuit.

During step 218, the CAD tools produce corresponding configuration data for programming the programmable logic device. Device resources are allocated so that balancing circuitry 132 and associated time-dependent control circuitry 186 are implemented to compensate for the power supply noise from the simultaneously switching core logic 114.

The programmable logic device 10 may be programmed with the configuration data produced during step 218 at step 220. Some of the configuration data is used to implement user-defined custom logic such as core logic 114. Other configuration data is used to implement user-designed or automatically designed balancing circuitry such as balancing circuitry 132 and associated control circuitry such as control circuitry 186.

At step 222, the device that has been programmed may be use in a system of the type described in connection with FIG. 2. During operation, input signals such as input signals Vinc1 are applied to the input of core logic 114. Simultaneous circuit element switching in core logic 114 is balanced in real time by the balancing effects of balancing circuitry 132, as controlled by control circuitry 186, thereby reducing power supply noise. The control data in memory array 190 may be loaded on system power-up, programmed into device during step 220, generated in real time, or otherwise provided for use in controlling balancing circuitry 132.

The foregoing is merely illustrative of the principles of this invention and various modifications can be made by those skilled in the art without departing from the scope and spirit of the invention.

What is claimed is:

1. An integrated circuit that is subject to power supply noise on a power supply signal, comprising:
    core logic that contributes to the power supply noise, wherein the core logic has an input that receives at least one input signal; and
    balancing circuitry that minimizes the power supply noise contribution of the core logic by compensating for simultaneously switching circuitry in the core logic, wherein the balancing circuitry has an input that receives an inverted version of the input signal that is received by the core logic.

2. The integrated circuit defined in claim 1 further comprising a positive power supply terminal and a ground power supply terminal, wherein the power supply signal is provided to both the core logic and the balancing circuitry through the positive power supply terminal and the ground power supply terminal, wherein the core logic has an output that provides at least one output signal and wherein the balancing circuitry produces no data output signals.

3. The integrated circuit defined in claim 2 wherein the integrated circuit comprises a programmable integrated circuit, wherein the core logic and the balancing circuitry comprises a plurality of programmable elements, wherein the programmable elements of the core logic contribute to the power supply noise by switching simultaneously with each other.

4. The integrated circuit defined in claim 1 wherein the balancing circuitry has an associated strength, the integrated circuit further comprising control circuitry that controls the balancing circuitry to adjust the strength in real time during operation of the integrated circuit.

5. A method for minimizing power supply noise in an integrated circuit that contains core logic with simultaneously switching circuitry that makes a power supply noise contribution to a power supply signal, comprising:
    switching balancing circuitry on the integrated circuit out of phase with the simultaneously switching circuitry of the core logic to compensate for the power supply noise contribution of the core logic and thereby minimize power supply noise on the power supply signal.

6. The method defined in claim 5 wherein the integrated circuit comprises programmable logic and programmable memory elements that provide control signals for the programmable logic, the method further comprising:
    with a computer-aided design tool, generating configuration data to load into the programmable memory elements to configure the programmable logic to implement the balancing circuitry.

7. The method defined in claim 5 wherein the integrated circuit comprises control circuitry, the method comprising:
    with the control circuitry, adjusting the balancing circuitry in real time to minimize the power supply noise.

8. The method defined in claim 5 wherein the simultaneously switching circuitry of the core logic comprises programmable logic device logic elements that switch simultaneously in response to an input signal, the method comprising:
    providing an inverted version of the input signal to the balancing circuitry on at least one control line.

9. The method defined in claim 5 wherein the integrated circuit comprises programmable logic and programmable memory elements that provide control signals for the programmable logic, the method further comprising:
    with a computer-aided design tool, generating configuration data to load into the programmable memory elements to configure the programmable logic to implement the core logic and the balancing circuitry; and
    during operation of the integrated circuit, controlling the balancing circuitry in real time using a memory controller and a memory array that contains control data.

10. An integrated circuit comprising:
    a positive power supply terminal;
    a ground power supply terminal, wherein the positive power supply terminal and the ground power supply terminal supply a power signal;
    core logic this is connected to the positive power supply terminal and the ground power supply terminal and that is powered by the power signal, wherein the core logic contains simultaneously switching circuit elements that contribute to power supply noise in the power signal;
    balancing circuitry without any output data paths, wherein the balancing circuitry is powered by the power signal and is connected to the power supply terminal and the ground power supply terminal and wherein the balancing circuitry compensates for the simultaneously switching circuit elements in the core logic to minimize the power supply noise in the power signal;
    control circuitry that controls the balancing circuitry, wherein the control circuitry has a memory array that stores control signals for the balancing circuitry, wherein the control circuitry has a memory controller that controls the memory array, and wherein the memory controller comprises a counter and address circuitry; and a plurality of address lines connected between the memory controller and the memory array.

11. The integrated circuit defined in claim 10 wherein the balancing circuitry has an associated strength and wherein the control circuitry adjusts the strength in real time during operation of the integrated circuit.

12. The integrated circuit defined in claim 10 wherein the counter and address circuitry are configured to systematically assert address signals on the address lines.

13. The integrated circuit defined in claim 12 wherein the balancing circuitry comprises a plurality of control gates, each of which receives a control signal from the control circuitry over an associated control line.

14. The integrated circuit defined in claim 13 wherein the core logic receives an input signal, wherein the control gates comprise logic gates each having one input connected to a respective one of the control lines and each having another input that receives an inverted version of the core logic input signal.

15. The integrated circuit defined in claim 10 wherein the integrated circuit comprises a programmable logic device and wherein the core logic comprises programmable core logic.

16. The integrated circuit defined in claim 15 wherein the balancing circuitry has an associated strength and wherein the control circuitry adjusts the strength in real time during operation of the integrated circuit.

17. The integrated circuit defined in claim 16 wherein the balancing circuitry comprises a plurality of control gates, each of which receives a control signal from the control circuitry over an associated control line, and wherein each of the control gates receives an inverted version of at least one signal that is applied to the programmable core logic.

* * * * *

UNITED STATES PATENT AND TRADEMARK OFFICE
CERTIFICATE OF CORRECTION

| | | |
|---|---|---|
| PATENT NO. | : 7,683,659 B1 | Page 1 of 1 |
| APPLICATION NO. | : 12/060791 | |
| DATED | : March 23, 2010 | |
| INVENTOR(S) | : Iliya G. Zamek et al. | |

It is certified that error appears in the above-identified patent and that said Letters Patent is hereby corrected as shown below:

In claim 10, at column 16, line 50, "this" should be changed to --that--

Signed and Sealed this

Eleventh Day of May, 2010

David J. Kappos
*Director of the United States Patent and Trademark Office*